United States Patent [19]

Van Order

[11] Patent Number: 4,988,140
[45] Date of Patent: Jan. 29, 1991

[54] VISOR WITH AN ELECTRICALLY CONTROLLED VANITY MIRROR COVER

[75] Inventor: Kim L. Van Order, Hamilton, Mich.

[73] Assignee: Prince Corporation, Holland, Mich.

[21] Appl. No.: 447,824

[22] Filed: Dec. 8, 1989

[51] Int. Cl.⁵ .................................................. B60J 3/04
[52] U.S. Cl. ................................... 296/97.2; 296/97.5; 362/74; 362/140
[58] Field of Search ................... 296/97.1, 97.2, 97.5; 362/74, 135, 136, 137, 140, 144

[56] References Cited

U.S. PATENT DOCUMENTS

| | | | |
|---|---|---|---|
| 2,528,038 | 7/1946 | Crise | 88/108 |
| 3,614,210 | 10/1971 | Caplan | 350/273 |
| 3,961,181 | 6/1976 | Golden | 250/208 |
| 4,161,653 | 7/1979 | Bedini et al. | 250/215 |
| 4,201,451 | 5/1980 | Jacob | 350/278 |
| 4,227,241 | 10/1980 | Marcus | 362/61 |
| 4,486,819 | 12/1984 | Marcus et al. | 362/142 |
| 4,521,078 | 6/1985 | Baeger | 350/334 |
| 4,603,946 | 8/1986 | Kato et al. | 350/331 |
| 4,635,549 | 4/1987 | Suzuki et al. | 350/331 |
| 4,648,011 | 3/1987 | Boote et al. | 362/135 |
| 4,676,601 | 6/1987 | Itoh et al. | 350/331 |
| 4,690,508 | 9/1987 | Jacob | 350/331 |
| 4,763,946 | 8/1988 | Robbins et al. | 296/97 |
| 4,809,140 | 2/1989 | Jönsas | 296/97.5 X |

FOREIGN PATENT DOCUMENTS

| | | | |
|---|---|---|---|
| 2246415 | 4/1974 | Fed. Rep. of Germany | 296/97.2 |
| 2158951 | 3/1979 | Fed. Rep. of Germany | 296/97.2 |
| 55219 | 4/1982 | Japan | 296/97.2 |
| 167323 | 9/1984 | Japan | 296/97.2 |

Primary Examiner—Margaret A. Focarino
Assistant Examiner—Gary C. Hoge
Attorney, Agent, or Firm—Price, Heneveld, Cooper, DeWitt & Litton

[57] ABSTRACT

A visor body includes a mirror and an electrically controlled light controlling member positioned in front of the mirror. It also includes a control circuit for the light control member for selectively rendering the member either light transmissive or opaque for selectively blocking the mirror from view. In a preferred embodiment of the invention, lights are provided behind the light control member which includes selective controlled zones in front of the lights for allowing illumination from the lights to be directed outwardly for use of the mirror in low ambient light conditions.

41 Claims, 3 Drawing Sheets

VISOR WITH AN ELECTRICALLY CONTROLLED VANITY MIRROR COVER

BACKGROUND OF THE INVENTION

The present invention pertains to vehicle visors, and particularly to visors with covered vanity mirrors.

Vehicle visors which include vanity mirrors, with or without illumination, have become increasingly popular vehicle accessories, and in fact, are standard equipment on many vehicles sold in the United States and other countries. When a visor including such a vanity mirror is in the lowered sun blocking position, the vanity mirror, if uncovered, provides a reflective surface which can be used by the vehicle occupant as a vanity mirror but also can be an annoying distraction to the driver or passenger when it is not desired to use the vanity mirror. This results due to random light reflections from outside objects and lights moving in relation to the vehicle.

In order to allow comfortable use of visors having vanity mirrors, a variety of cover constructions have been devised for covering the mirror and preventing such distractions as well as providing an additional safety factor in covering the frangible mirror itself. With the advent of modern materials for mirrors including laminated glass, plastic, adhesive backings and the like, the safety aspect of the cover with respect to preventing flying mirror fragments if there is an accident, is less of a concern since the newer materials are either unbreakable or do not generate glass shards in the event of an impact. Thus the importance of the cover in recent years has been more decorative or to cover the mirror to prevent distraction due to moving reflective images including light from the driver's eyes or the occupant's eyes.

A variety of different vanity mirror covers for visors have been proposed including a pivoted cover such as disclosed in U.S. Pat. No. 4,227,241 and covers which pivot from the lower edge of the mirror as well. Other visors may include vanity mirrors which are covered with a sliding cover such as disclosed in U.S. Pat. No. 4,648,011. Another approach is for the vanity mirror itself to retract within the body of the visor as for example disclosed in U.S. Pat. No. 4,486,819. All of these cover designs provide a vanity mirror which may or may not be illuminated, which is readily accessible for use and which is covered when not in use when the visor is in a lowered sun blocking position. Such construction, however, requires the additional costs of providing a separate cover mounting mechanism and assembly expense of the mechanical cover.

SUMMARY OF THE PRESENT INVENTION

The visor of the present invention provides a vanity mirror mounted to the body of a vehicle visor and which includes an electrically actuated cover which can be selectively operated by actuation of a push-button switch to render the mirror nonvisible and therefore non-reflective. This can be achieved by the use of a variety of materials including a liquid crystal film placed in front of a conventional mirror to selectively blacken-out the mirror surface and therefore optically cover the mirror when not in use. Such material can also be employed as a light control between a source of illumination adjacent the mirror for selectably providing illumination when the mirror is uncovered as well.

Thus visors incorporating the present invention include a visor body having mounted therein a mirror and an electrically controlled light controlling member positioned in front of the mirror and control means for the light control member for selectively rendering the member either transmissive or opaque for selectively blocking the mirror from view. In a preferred embodiment of the present invention, light means are provided behind said light control member which includes selective controlled zones or areas in front of the light means for allowing illumination from said light means to be directed outwardly for use of the mirror in low ambient light conditions.

With such a system, therefore, an electrically controlled and optically covered mirror is provided for a vanity mirror visor without the necessity of a mechanical cover or other mechanism for storing a mirror when not in use and when the visor is in a lowered sun blocking position. Such a system provides ease of operation and the desired optical covering of the mirror when not in use and can be incorporated in a relatively thin visor package providing a modern design appearance.

These and other features, objects and advantages of the present invention will become apparent upon reading the following description thereof together with reference to the accompanying drawings in which:

DETAILED DESCRIPTION OF THE PREFERRED EMBODIMENT

Figure 1:
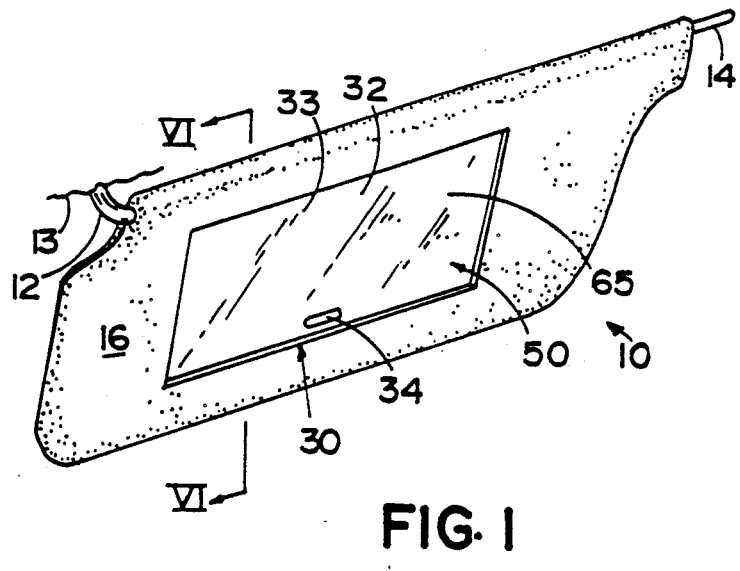
FIG. 1 is a perspective view of a visor incorporating the system of the present invention.
Figure 6:
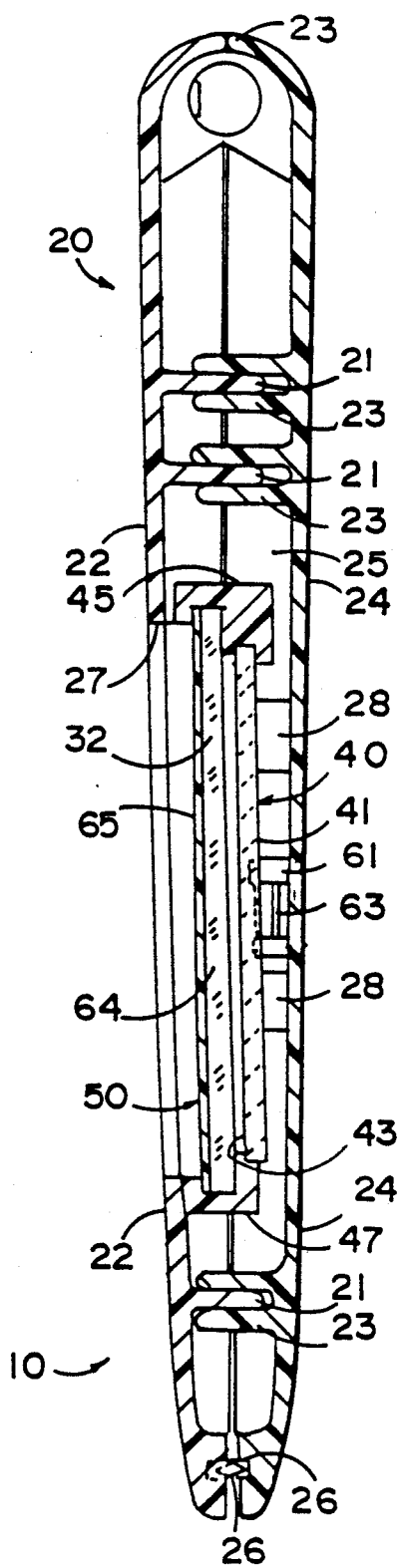
FIG. 6 is a vertical cross-sectional view of the visor shown in FIG. 1 taken along section lines VI—VI of FIG. 1.
Figure 7:
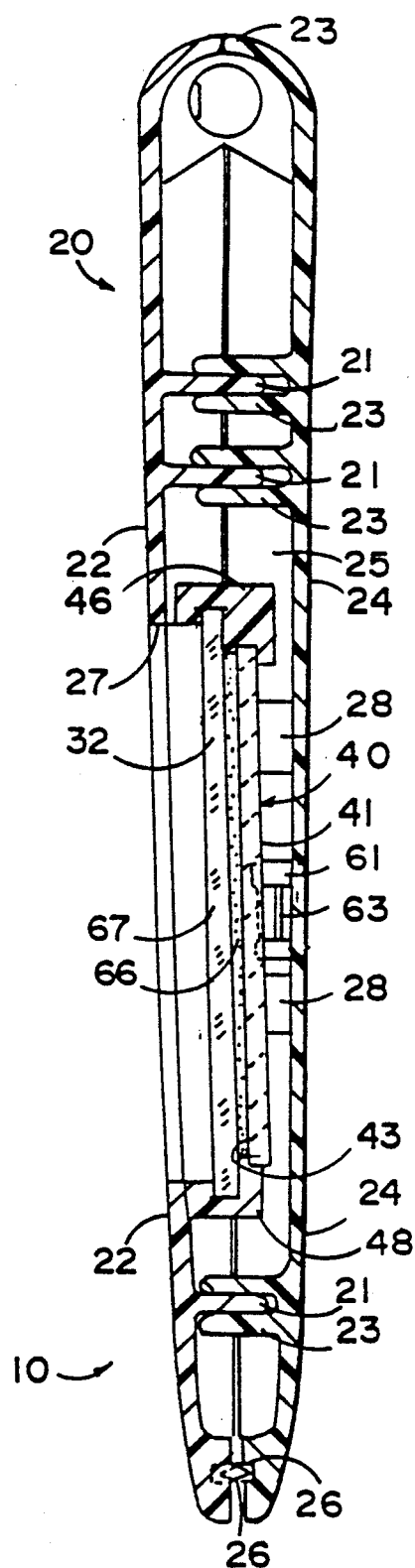
FIG. 7 is a vertical cross-sectional view of an alternative embodiment of the light control cover which can be employed with the visor construction shown in FIG. 1.

Referring initially to FIG. 1, there is shown a visor 10 incorporating the present invention. The visor includes a pivot rod 12 extending from one end thereof for mounting to the roof 13 of a vehicle utilizing a conventional mounting bracket assembly (not shown) for allowing the visor to pivot between a raised stored position and a lowered use position as shown, as well as pivot to the side window position of a vehicle in a conventional fashion. The visor also includes a center support rod 14 extending from an opposite end thereof for removably supporting the opposite end of the visor in a socket typically integral with the rear view mirror assembly. Visor 10 has a generally planar body which can comprise a molded polymeric butterfly-type core 20 as shown in FIGS. 6 and 7 and can be of the type generally described in U.S. Pat. No. 4,763,946 issued on Aug. 16, 1988 and the disclosure of which is incorporated herein by reference. Core or body 20 is covered by a suitable decorative upholstery material 16 to conform the appearance of the visor to that of the vehicle interior including the headliner.

Visor 10 also includes an electrically covered vanity mirror assembly 30 which is mounted within the visor core 20 as best seen in FIGS. 6 and 7 and which includes an outer surface 32 which can be darkened as represented by the cross hatching 33 in FIG. 1 for blocking visibility to a mirror 40 positioned behind a light controlling member 50. Member 50 can be controlled to be opaque and generally a dark color such as black as illustrated in FIG. 1 or selectively varied to become transparent and provide visibility to the mirror 40 positioned therebehind. The light transmissivity of the light control member 50 in connection with assembly 30 is controlled by an electrical switch 34 which can be a membrane-type switch mounted as best illustrated in FIG. 1 to switch the optical, electric cover for mirror 40 on and off i.e. change the member from a light opaque to a light transmissive condition for controlling the cover so formed. The various operational features of the visor and its electrically controlled cover are now described in connection with FIGS. 2-5 followed by a description of the physical construction of two embodiments of the electrically controlled cover as well as the electrical circuitry for its operation.

Figure 2:
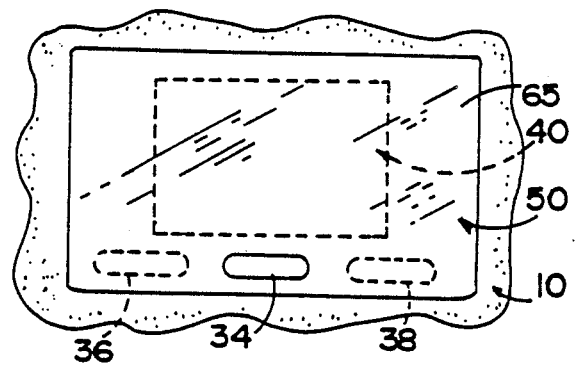
FIG. 2 is a fragmentary front elevational view of the visor shown in FIG. 1 shown in a first operational condition.
Figure 3:
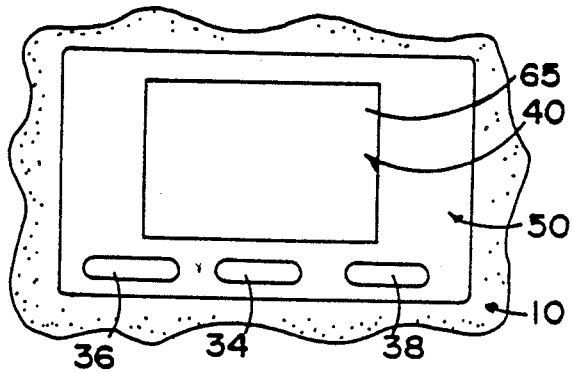
FIG. 3 is a fragmentary front elevational view of the visor shown, in FIG. 1 shown in a second operational condition.

Referring initially to FIG. 2, there is shown a fragmentary plan view of the visor 10 shown in FIG. 1 showing the member 50 as exposed to the face of the user when the visor 10 is in a lowered use position. Switch 34 is always visible through a non-reflective transparent mylar film 65 and is located on the lower center area of member 50 and serves to activate the zoned light control member 50. Upon a first pressing of switch 34 the mirror 40 behind member 50 is visible as illustrated in FIG. 3 as are two additional switches 36 and 38 for providing either a relatively bright white light or a tinted light such as a rose colored light by the selective activation of push-button membrane switches 36 and 38 respectively. Thus actuation of switch 34 effectively "opens" the electrically controlled cover by changing member 50 from opaque to transparent thereby exposing mirror 40 and additional control surface areas such as switches 36 and 38 as seen in FIG. 3. A second actuation of switch 34 "closes" the cover returning the visor to the operational state shown in FIGS. 1 and 2 rendering material 50 opaque.

Figure 4:
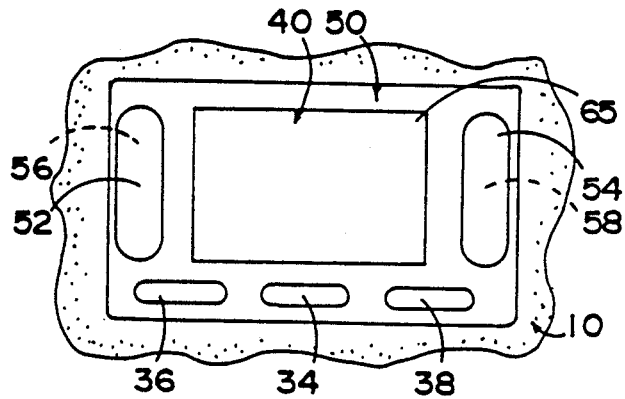
FIG. 4 is a fragmentary front elevational view of the visor shown in FIG. 1 shown in a third operational condition.

As shown in FIG. 4, by for example, activating switch 36, controllable opposite zones 52 and 54 of member 50 become light transmissive to expose white light sources 56 and 58 (FIG. 8) positioned behind member 50 and also activated by the actuation of switch 36. Zones 52 and 54 are adjacent and spaced from opposite edges of the mirror 40.

Figure 5:
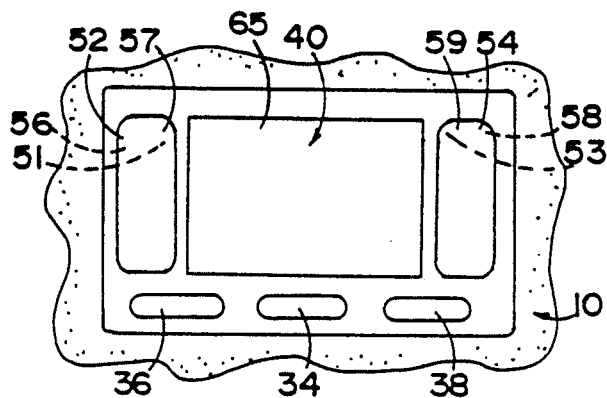
FIG. 5 is a fragmentary front elevational view of the visor shown in FIG. 1 shown in a fourth operational condition.

Actuation of the second switch 38 as best seen in FIG. 5 controls a pair of additional zones 57 and 59 contiguous with zones 52 and 54 of member 50. It also activates tinted light sources 51 and 53 (FIG. 8) behind zones 57 and 59 respectively which extend immediately adjacent opposite sides of mirror 40.

Thus with the visor system of the present invention, the electrically controlled cover can be activated to optically uncover the mirror as illustrated in FIG. 3 with no illumination and/or may be selectively further activated to provide either white illumination as illustrated in FIG. 4 or a rose tinted illumination as illustrated in FIG. 5. Naturally, the mirror may or may not include illumination means as described below in the remaining Figs. and can be operated only as a mirror as shown in FIG. 3 in which case switches 36 and 38 can be deleted and the cover control switch 34 would be the only operational switch for use of the mirror behind light control member 50.

Referring now to FIG. 6, there is shown the visor construction employing a light controlling member 50. The visor core 20 is a butterfly-type core which includes a front wall 22 and a rear wall 24 integrally formed of a polymeric material such as polypropylene with a living hinge junction 23 between the core's halves. The core includes mounting posts 21 extending rearwardly from front section 22 and sockets 23 extending forwardly from rear section 24 for receiving the interlocking post 21. Additionally, the core includes pins and recesses 25 and 26 along its edge for locking the fabric 16 (not shown in FIG. 6) around the edge of the core 20. This construction is disclosed in greater detail in the above noted U.S. Pat. No. 4,763,946.

The front wall 22 includes a generally open central area 25 into which the vanity mirror assembly 30 is mounted. Core 20 and particularly the front wall 22 of the core includes an opening 27 defining a recess into which the mirror assembly 30 is mounted. Assembly 30 includes a flat rectangular mirror 40 which is mounted to the rear inner surface of core 20 against wall 24 by means of mounting bosses 28 in a conventional fashion such as by a bonding adhesive between the forward facing surface of mounting bosses 28 and the rear surface 41 of mirror 40. The rear wall 24 may also include an integral framework for snap receiving the mirror if desired. The forward surface 43 of mirror 40 faces outwardly from recess 27 and provides a reflective image to persons viewing the visor 10 when in a lowered use position and when the electrically controlled cover including light controlling member 50 is activated. To either side of the mirror (behind the mirror 40 in FIG. 6), there is mounted within area 25 the sources of illumination 51, 53, 56 and 58. Source 51 is illustrated in FIG. 6 and includes a socket 61 and bulb 63 which in the case of illumination source 51 is a bulb with a red coating to provide a rose tinted hue when illuminated.

Figure 8:
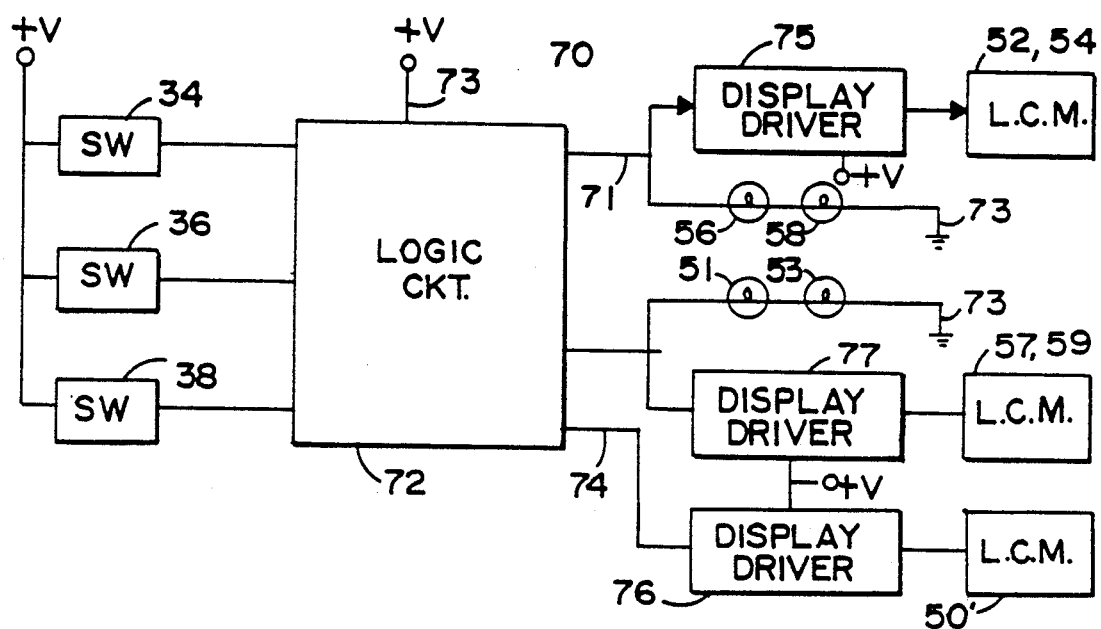
FIG. 8 is an electrical circuit diagram in block form showing the control circuit for controlling either of the electrical cover embodiments disclosed.

Electrical conductors 73 (FIG. 8) extend to the socket and are arranged through the core and through the hollow visor pivot rod 12 in a conventional manner to extend to the source of power and are controlled by the control circuit 70 shown in FIG. 8 which circuit 70 is also mounted within the center area 25 of the core 20 in a conventional manner as by positioning on a circuit board mounted to the core by suitable bonding adhesives.

Positioned in front of mirror 40 is the planar rectangular light control member 50 of the first embodiment of the invention which is mounted in spaced relationship with a gap of approximately 0.1 inches by means of mounting brackets 45 and 47 extending between the mirror 40 and member 50 on upper and lower edges thereof to hold members 50 in fixed relationship in front of mirror 40. Member 50, in the first embodiment, comprises a reflective-type liquid crystal display (LCD) panel 64 which preferably is a pneumatic curvilinear aligned phase device with an anti-glare clear mylar film 65 on its front surface to reduce reflection when the light controlling member 50 is in an off or opaque condition. The mylar film 65 also covers switches 34, 36 and 38 and is deflectable to allow actuation of these membrane switches which are surface mounted to the lower edge of panel 50. Panel 50 is divided into five separate zones or areas with the central zone covering the entire surface area of mirror 40 and, as noted earlier, zones 52 and 54 aligned in front of lights 56 and 58; and zones 57 and 59 aligned in front of light sources 51 and 53. Thus the cell 50, although of conventional LCD construction, is especially shaped as illustrated in FIGS. 3–5 and 8 to provide five separately controlled "windows" for the mirror and illumination means associated with the visor 10. The LCD-type reflective display is available from a number of commercial sources including the Taliq Corporation of Mountainview, Calif. Instead of employing the LCD material 64 as illustrated in FIG. 6, an electrochromic-type light control panel can be used as illustrated in FIG. 7.

In FIG. 7, an electrochromic panel 66 is mounted immediately adjacent and in contact with mirror 40 by means of mounting brackets 46 and 48 and can be of either the wet or dry-type. The wet-type electrochromic material includes a clear glass outer cover with the indium tin oxide (ITO) material sandwiched between the outer glass layer 67 and the mirror 43. In the preferred embodiment of this assembly the illuminated vanity mirror package 30 is integrally made to include the mirror, the electrically actuated coatings and the outer cover surface. Alternately, the electrochromic material 66 can be a so-called dry-type material again in which a glass substrate 67 includes mounted thereon a dry coating of voltage responsive electrochromic material. This dry-type cell can be manufactured in a manner taught by U.S. Pat. No. 4,645,308 issued on Feb. 24, 1987, the disclosure which is incorporated herein by reference. Also electrochromic material is commercially available from a number of sources including Solar Energy Research Institute of Golden, Col.

Again, as with the LCD-type display, with the electrochromic-type displays, the light controlling member 50 is made with five separately controllable zones to selectively uncover the mirror and light sources preferably on opposite edges of the mirror. With both types of light controlling members, an electrical control system is provided which is actuated by the switches and the vehicle's operating power to selectively render the light controlling member either light transmissive or opaque. An example of a control system suitable for use in connection with either types of the light control members as illustrated in FIG. 8 is now described.

The control circuit 70 in FIG. 8 includes a source of operating power +V which is illustrated schematically and which comprises electrical power conductors 73 leading from the vehicle's power supply, into the visor body in a conventional manner through the pivot rod assembly as noted earlier. Switches 34, 36 and 38 are suitably coupled to the +V source to provide a logic "1" signal to the input of logic circuit 72 which includes latches which respond to successive receipts of logic "1" signals from the momentary push-button switches 34, 36 and 38 to selectively control the areas of the light control member 50.

Thus the initial push-button actuation of switch 34 provides a logic high output "1" on conductor 74 associated with logic circuit 72 which remains on until the next successive actuation of switch 34 which then turns off the logic level "1" on conductor 74. This logic level "1" is applied to a display driver circuit 76 providing output control signals to the center zone 50' of the light control member 50 which is located directly in front of and fully covers mirror 40. It is noted here that the conductors extending from display driver 76 to the center light control zone 50' may comprise a ribbon-type series of conductors sufficient to provide the number of activating lines necessary for providing operational power to the light control member. Such ribbon conductors typically are integrally formed on the light control modules be it an LCD-type or an electrochromic-type. Such ribbon conductors can extend directly to the display drivers which in turn are wired to the logic circuit 72 with the conductors illustrated in FIG. 8.

The logic circuit also receives logic "1" and "0" signals from the first light control switch 36 to provide a signal on output conductor 71 which goes to a logic high "1" level and constitutes the +V supply voltage which activates serially coupled light bulbs 56 and 58 having their remaining terminals coupled to ground as indicated in FIG. 8. The logic "1" level also is applied to a display driver 75 for activating the light control module zones 52 and 54 on the outer edges on the opposite sides of mirror 40 as illustrated in FIGS. 2–5. Thus the actuation of switch 36 the first time activates both bulbs 56 and 58 and opens or renders light transmissive, the zones 52 and 54 of the light control module 50. Successive actuation of switch 36 is decoded by logic circuit 72 to deactivate bulb 56 and 58 and again render the zones 52 and 54 of light control module opaque by turning off the illumination and blocking the light window so formed.

Similarly, switch 38 is coupled to logic circuit 72 and to a display driver 77 and to bulbs 51 and 53 for similarly controlling the red colored bulbs 51 and 53 upon successive actuation of switch 38 together with the light controlling zones 57 and 59 of the light control module 50. The display drivers and logic circuit are relatively small in physical size and can be easily incorporated into the center area 25 of the core adjacent the recess 27 or even mounted on the back side of mirror 40 if desired.

In a mass produced system of the present invention, the mirror light control member and the electric control circuit is preassembled in a suitable framework for mounting to the core 20 of the visor and for such purpose, the mounting brackets such as brackets 45 and 47 shown in FIG. 6 are configured to define a frame for the light control member and associated mirror. The switches 34, 36 and 38 as noted above are membrane switches which can be integrally formed with the light control module during the manufacture thereof or can be separate discrete push-button switches mounted externally to the light control module if desired. The utilization of the membrane switches behind, for example, the mylar film 65 as shown in FIG. 6 embodiment presents a clean, neat and modern appearance to the unit. As shown in FIGS. 2–5, these light controlling switches will normally not be visible unless the mirror is electrically uncovered.

These and other modifications to the preferred embodiments of the invention described herein can be made by those skilled in the art without departing from the spirit or scope thereof as defined by the appended claims.

The embodiments of the invention in which an exclusive property or privilege is claimed are defined as follows:

1. A visor for a vehicle comprising:

a visor body including means for mounting said visor to a vehicle for movement between a raised stored position and a lowered use position, said body including a mirror mounted therein;

an electrically operated stationary cover for said mirror for selectively exposing said mirror for use and blocking said mirror when not in use, said cover fixedly mounted to said visor body adjacent and in front of said mirror; and electrical control means for operating said cover.

2. The apparatus as defined in claim 1 wherein said visor body is generally planar and includes a core having a recess formed therein for receiving at least said mirror.

3. The apparatus as defined in claim 2 wherein said electrically operated cover is mounted within said recess of said core.

4. The apparatus as defined in claim 3 wherein said cover is a planar light transmission controlling member.

5. The apparatus as defined in claim 4 wherein said cover is made of a material which responds to electrical control signals for changing states from a generally opaque condition for covering said mirror to a generally transparent condition uncovering said mirror.

6. The apparatus as defined in claim 5 wherein said material for said cover comprises an LCD panel.

7. The apparatus as defined in claim 5 wherein said cover comprises a panel of electrochromic material.

8. The apparatus as defined in claim 5 wherein said control means comprises a switch for applying a control signal to said light transmission controlling member.

9. The apparatus as defined in claim 8 wherein said switch is mounted to said light controlling member.

10. A visor for a vehicle comprising:
a generally planar visor body including a core having a recess for receiving a mirror mounted therein;
an electrically operated cover for said mirror for selectively exposing said mirror for use and blocking said mirror when not in use, said cover mounted within said recess of said core adjacent and in front of said mirror, wherein said cover is a planar light transmission controlling member made of a material which responds to electrical control signals for changing states from a generally opaque condition for covering said mirror to a transparent condition uncovering said mirror; and electrical control means comprising a membrane-type switch mounted to said light transmission controlling member for applying a control signal to said light transmission controlling member for operating said cover.

11. The apparatus as defined in claim 10 wherein said light transmission controlling member comprises an LCD panel.

12. The apparatus as defined in claim 10 wherein said light transmission controlling member comprises a panel of electrochromic material.

13. A visor for a vehicle comprising:
a generally planar visor body including a core having a recess for receiving a mirror mounted therein;
an electrically operated cover for said mirror for selectively exposing said mirror for use and blocking said mirror when not in use, said cover mounted within said recess of said core adjacent and in front of said mirror, wherein said cover is a planar light transmission controlling member made of a material which responds to electrical control signals for changing states from a generally opaque condition for covering said mirror to a transparent condition uncovering said mirror and further including light means positioned adjacent said mirror and behind said light transmission controlling member and wherein said light transmission controlling member is divided into separately controlled zones with one zone in front of said mirror and another zone in front of said light means.

14. The apparatus as defined in claim 13 wherein an electrical control means is provided comprising a plurality of membrane-type switches mounted behind said light transmission controlling member wherein a first switch is continuously visible through a window in said light transmission controlling member and is employed to operate said one zone, and a second switch is positioned behind said one zone and is visible when said mirror is optically uncovered to allow operation of said light means.

15. The apparatus as defined in claim 13 wherein said light transmission controlling member comprises an LCD panel.

16. The apparatus as defined in claim 13 wherein said light transmission controlling member comprises a panel of electrochromic material.

17. A visor for a vehicle comprising:
a visor body including means for mounting said visor to a vehicle for movement between a raised stored position and a lowered use position, said body further including a mirror mounted therein;
an electrically operated light transmission control member defining a cover for said mirror for selectively exposing said mirror for use when said light transmission control member is transparent and covering said mirror when said light transmission control member is opaque when said mirror is not in use, said light transmission control member fixedly mounted to said visor body in front of said mirror; and electrical control means for operating said light transmission control member.

18. The apparatus as defined in claim 17 wherein said light transmission control member comprises an LCD panel.

19. The apparatus as defined in claim 17 wherein said light transmission control member comprises an electrochromic panel.

20. The apparatus as defined in claim 17 wherein said visor body is generally planar and includes a core having a recess formed therein for receiving at least said mirror.

21. The apparatus as defined in claim 20 wherein said electrically operated light transmission control member is mounted to said visor body in front of said mirror.

22. The apparatus as defined in claim 21 wherein said control means comprises a switch for applying a control signal to said light transmission control member.

23. The apparatus as defined in claim 22 wherein said switch is mounted to said light transmission control member.

24. A visor for a vehicle comprising:
a visor body including a mirror mounted therein;
an electrically operated light transmission control member defining a cover for said mirror for selectively exposing said mirror for use when said light transmission control member is transparent and covering said mirror when said light transmission control member is opaque when said mirror is not in use, said light transmission control member mounted to said visor body in front of said mirror;

electrical control means for operating said light transmission control member; and light means mounted to said visor for providing illumination for use of said mirror in low ambient light conditions.

25. The apparatus as defined in claim 24 wherein said light transmission member is divided into zones with one zone extending in front of said mirror and at least another zone extending to a side of said mirror, and wherein said electrical control means selectively operates said zones independently.

26. The apparatus as defined in claim 25 wherein said light means is mounted behind said another zone to allow said light transmission control member to cover said light means by being opaque when said light means is off and for being transparent to uncover said light means when said light means is activated.

27. The apparatus as defined in claim 26 wherein said light transmission member comprises an LCD panel.

28. The apparatus as defined in claim 26 wherein said light transmission member comprises an electrochromic panel.

29. A visor for a vehicle comprising:

a visor body including a mirror mounted therein, wherein said visor body is generally planar and includes a core having a recess formed therein for receiving at least said mirror;

an electrically operated light transmission control member defining a cover for said mirror for selectively exposing said mirror for use when said light transmission control member is transparent and covering said mirror when said light transmission control member is opaque when said mirror is not in use, said light transmission control member mounted to said visor body in front of said mirror; and electrical control means including a switch mounted to said light transmission control member for applying a control signal to said light transmission control member wherein said switch comprises a membrane-type switch for operating said light transmission control member and wherein said electrically operated light transmission control member is mounted to said visor body in front of said mirror.

30. The apparatus as defined in claim 29 and further including light means positioned adjacent said mirror and behind said light transmission control member and wherein said light transmission control member is divided into separately controlled zones with one zone in front of said mirror and another zone in front of said light means.

31. The apparatus as defined in claim 30 wherein said control means comprises a plurality of membrane-type switches mounted behind said light transmission control member wherein a first switch is continuously visible through a window in said light transmission control member and is employed to actuate said one zone, and second switch is positioned behind said one zone and is visible when said mirror is optically uncovered to allow actuation of said light means.

32. The apparatus as defined in claim 31 wherein said light transmission control member comprises an LCD panel.

33. The apparatus as defined in claim 31 wherein said light transmission control member comprises a panel of electrochromic material.

34. A visor for a vehicle comprising:

a visor body including a mirror mounted therein;

an electrically operated cover for said mirror for selectively exposing said mirror for use and blocking said mirror when said mirror is not in use, said cover comprising a light transmission control panel responsive to electrical control signals to change between an opaque condition blocking said mirror to a transparent condition exposing said mirror, and wherein said panel is divided into a plurality of separate zones with one zone covering said mirror and another zone adjacent said mirror, said cover being mounted to said visor body in front of said mirror;

light means positioned behind said another zone for selectively providing illumination for the use of said mirror; and electrical control means for operating said zones of said control panel to selectively expose said mirror and selectively expose said light means.

35. The apparatus as defined in claim 34 wherein said light transmission control panel comprises an LCD panel.

36. The apparatus as defined in claim 34 wherein said light transmission control panel comprises a panel of electrochromic material.

37. The apparatus as defined in claim 34 wherein said control means includes a switch for applying a control signal to said light transmission control member.

38. The apparatus as defined in claim 37 wherein said switch is mounted to said light transmission control panel.

39. The apparatus as defined in claim 38 wherein said switch comprises a membrane-type switch.

40. The apparatus as defined in claim 39 wherein said light transmission control panel comprises an LCD panel.

41. The apparatus as defined in claim 39 wherein said light transmission control panel comprises a panel of electrochromic material.

* * * * *

UNITED STATES PATENT AND TRADEMARK OFFICE
CERTIFICATE OF CORRECTION

PATENT NO.   :   4,988,140

DATED        :   January 29, 1991

INVENTOR(S)  :   Kim L. Van Order

It is certified that error appears in the above-identified patent and that said Letters Patent is hereby corrected as shown below:

Column 9, Claim 25, Line 9:
  Before "member" insert --control--;

Column 9, Claim 27, Line 21;
  Before "member" insert --control--;

Column 9, Claim 28, Line 23;
  Before "member" insert --control--;

Column 10, Claim 31, Line 7:
  Before "second" insert --a--.

Signed and Sealed this

Fourteenth Day of July, 1992

Attest:

DOUGLAS B. COMER

*Attesting Officer*        Acting Commissioner of Patents and Trademarks